UNITED STATES PATENT OFFICE.

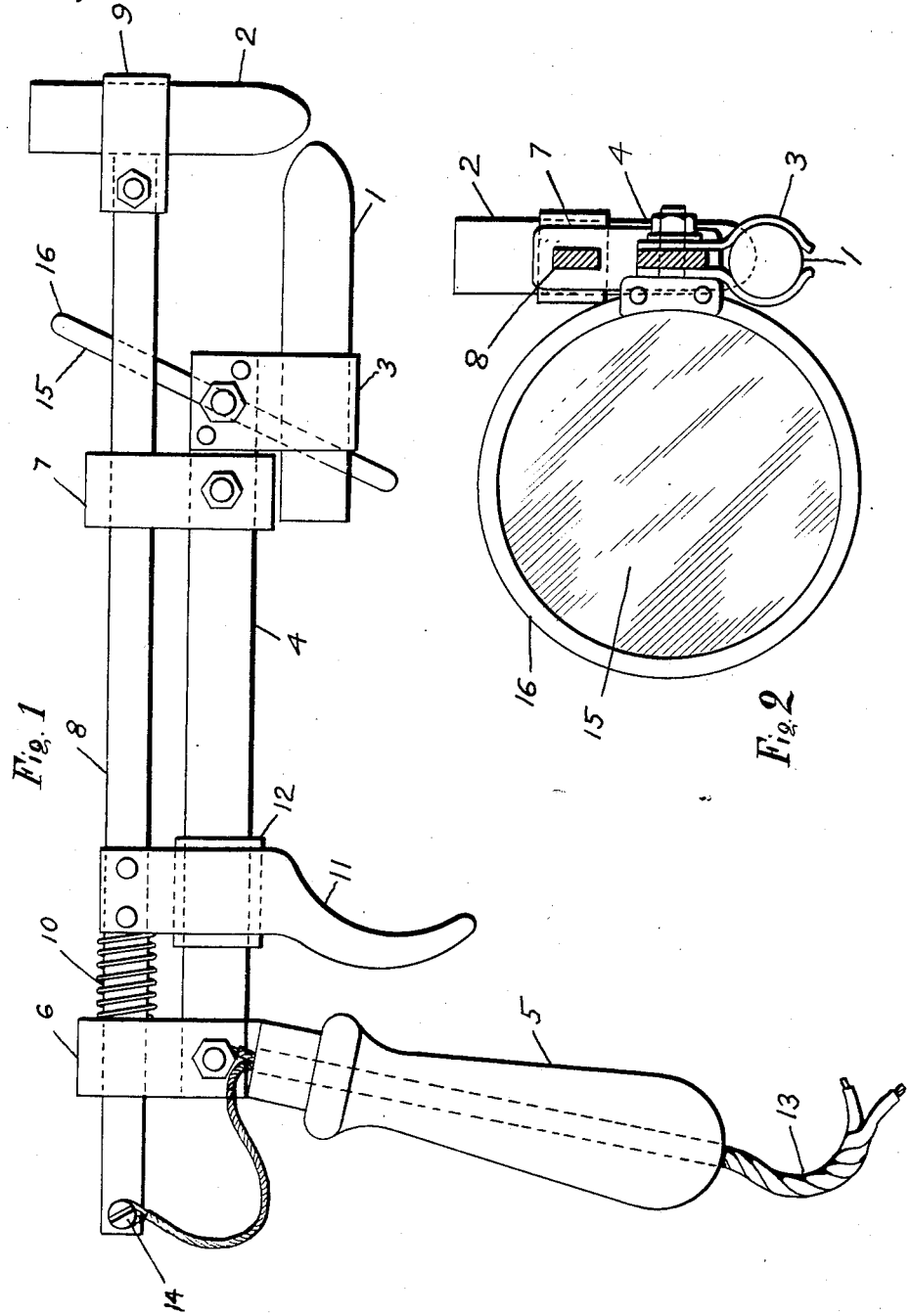

JOHN P. NIKONOW, OF DAYTON, OHIO.

ELECTRIC WELDING APPARATUS.

1,264,326.  Specification of Letters Patent.  Patented Apr. 30, 1918.

Application filed September 7, 1917. Serial No. 190,145.

*To all whom it may concern:*

Be it known that I, JOHN P. NIKONOW, a citizen of Russia, and a resident of the city of Dayton, in the county of Montgomery and State of Ohio, have invented a new and useful Improvement in the Electric Welding Apparatus, of which the following is a specification.

My invention relates to the electric welding apparatus and it has particular reference to such mechanism as embody manually controlled electric arc.

The object of my invention is to provide a simple and convenient arrangement, whereby an electric arc can be maintained between the electrodes of a portable apparatus, which can be manipulated with one hand, the length of the arc being controlled by the movement of the fingers of the same hand.

In the construction of electric welding apparatus, difficulties have been encountered because of lack of a convenient arrangement to control the distance of the arc from the work and at the same time the length of the arc, itself.

According to my invention, I employ an electric welding apparatus, comprising two carbon electrodes, movably attached to the parts of a portable and manually operated frame, so that the apparatus can be held in one hand at a proper distance from the piece to be welded and at the same time, the distance between the electrodes can be continuously controlled by the movement of the fingers.

In the accompanying drawings, Figure 1, is a side view of the apparatus and Fig. 2, end view (section), showing attachment of the eye protecting glass.

Electrode 1 is placed in a metal clamp 3, attached to a metal bar 4 with an insulated handle 5. Insulated blocks 6 and 7 are fastened to the bar 4 and form guides for the movable bar 8, which supports electrode 2 with the clamp 9. Spring 10 tends to move the bar 8 and electrode 2 away from the electrode 1, but the electrodes may be brought in contact or kept at a desired distance by means of a finger hook 11, insulated from the bar 4 by means of a bushing 12. Electric conductors 13 pass through the hollow handle 5, one lead being attached to the bar 4, the other to the bar 8 by means of the screw 14. Dark glass 15 in a frame 16 is attached to the bar 4 and serves to protect the eyes and face of the operator from direct radiation of the arc between electrodes 1 and 2.

A suitable transformer (not shown) may be employed between the conductor 13 and the source of the current, in order to obtain suitable low voltage at the proper current.

An important advantage of the mechanism above described is, that it can be easily manipulated and controlled with one hand, so that welding, brazing, soldering or heating can be done on the pieces without disturbing their position or removing them from their position.

I claim as my invention:

1. In an electric welding apparatus, the combination with the electrodes, slidably mounted in relation to each other, one electrode having a handle and the other a finger trigger, and means for conducting electric current to said electrodes.

2. In an electric welding apparatus, the combination with the electrodes, slidably mounted in relation to each other, one electrode having a handle and the other a finger trigger, a means for conducting electric current and a protecting reflector, fastened to one of the electrodes.

3. In an electric welding apparatus, the combination with the electrodes, slidably mounted in relation to each other, and a manually operated controlling device for said electrodes, consisting of a sliding frame with a finger trigger.

4. In an electric welding apparatus, the combination with the electrodes, slidably mounted in relation to each other, a manually operated controlling device for said electrodes, consisting of a sliding frame, supporting one of said electrodes, with a finger trigger in a working relation to the handle, attached to the other electrode.

5. In an electric welding apparatus, the combination with the electrodes, slidably mounted in relation to each other, a manually operated controlling device for said electrodes, consisting of a sliding frame, supporting one of said electrodes, with a finger trigger in a working relation to the handle, attached to the other electrode and a protecting reflector, consisting of a dark glass, attached to the electrode supporting frame.

In testimony whereof, I have hereunto subscribed my name this 4th day of Sept., 1917.

JOHN P. NIKONOW.

Witnesses:
F. W. Schaefer,
H. L. Hammaker.